Jan. 17, 1928.

W. H. FENOUGHTY

MANGLE

Filed March 9, 1925

INVENTOR:
WILLIAM H. FENOUGHTY.
By Bruce S. Elliott
ATTORNEY.

Jan. 17, 1928. 1,656,783
W. H. FENOUGHTY
MANGLE
Filed March 9, 1925 7 Sheets-Sheet 2
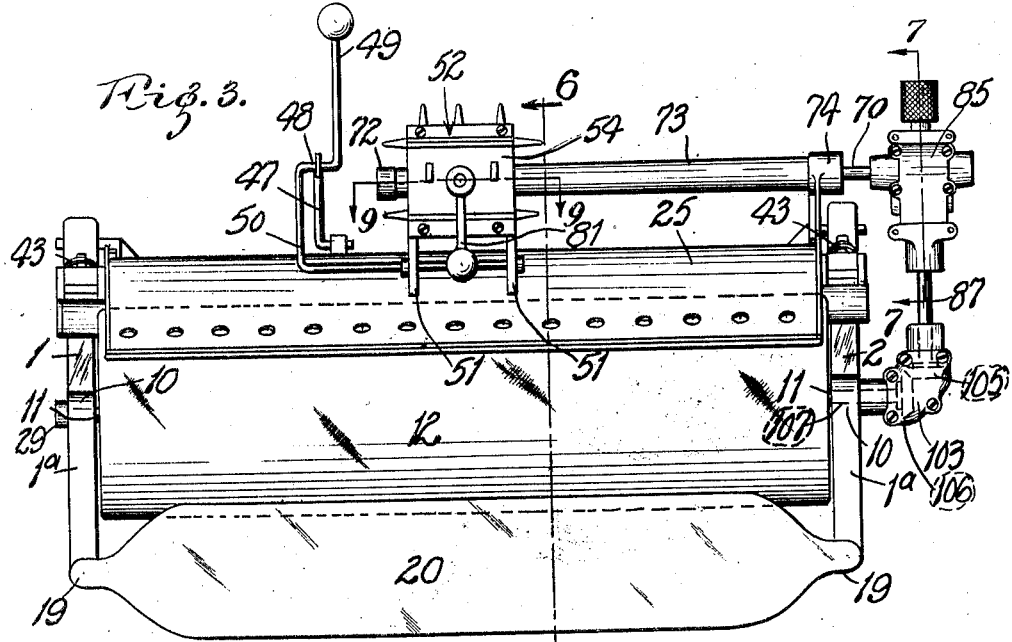
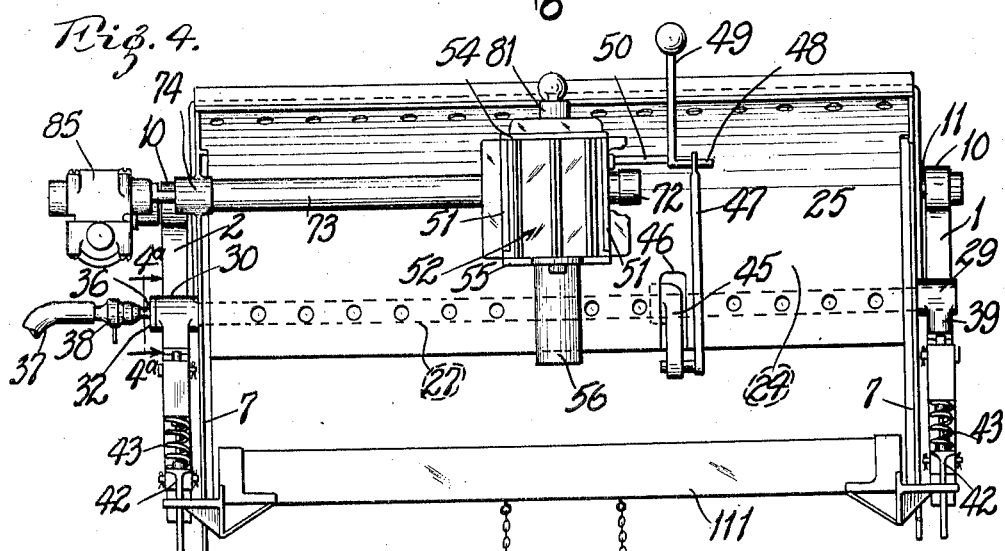
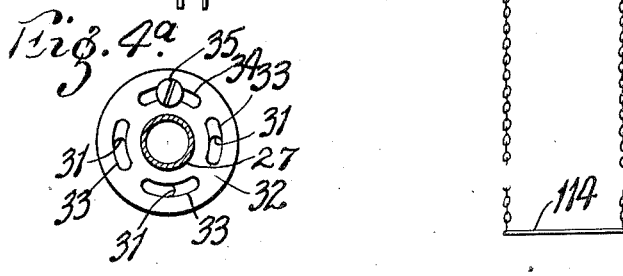
INVENTOR:-
WILLIAM H. FENOUGHTY.
ATTORNEY.

Jan. 17, 1928. 1,656,783
W. H. FENOUGHTY
MANGLE
Filed March 9, 1925 7 Sheets-Sheet 3

INVENTOR:
WILLIAM H. FENOUGHTY.
BY Bruce S. Elliott
ATTORNEY.

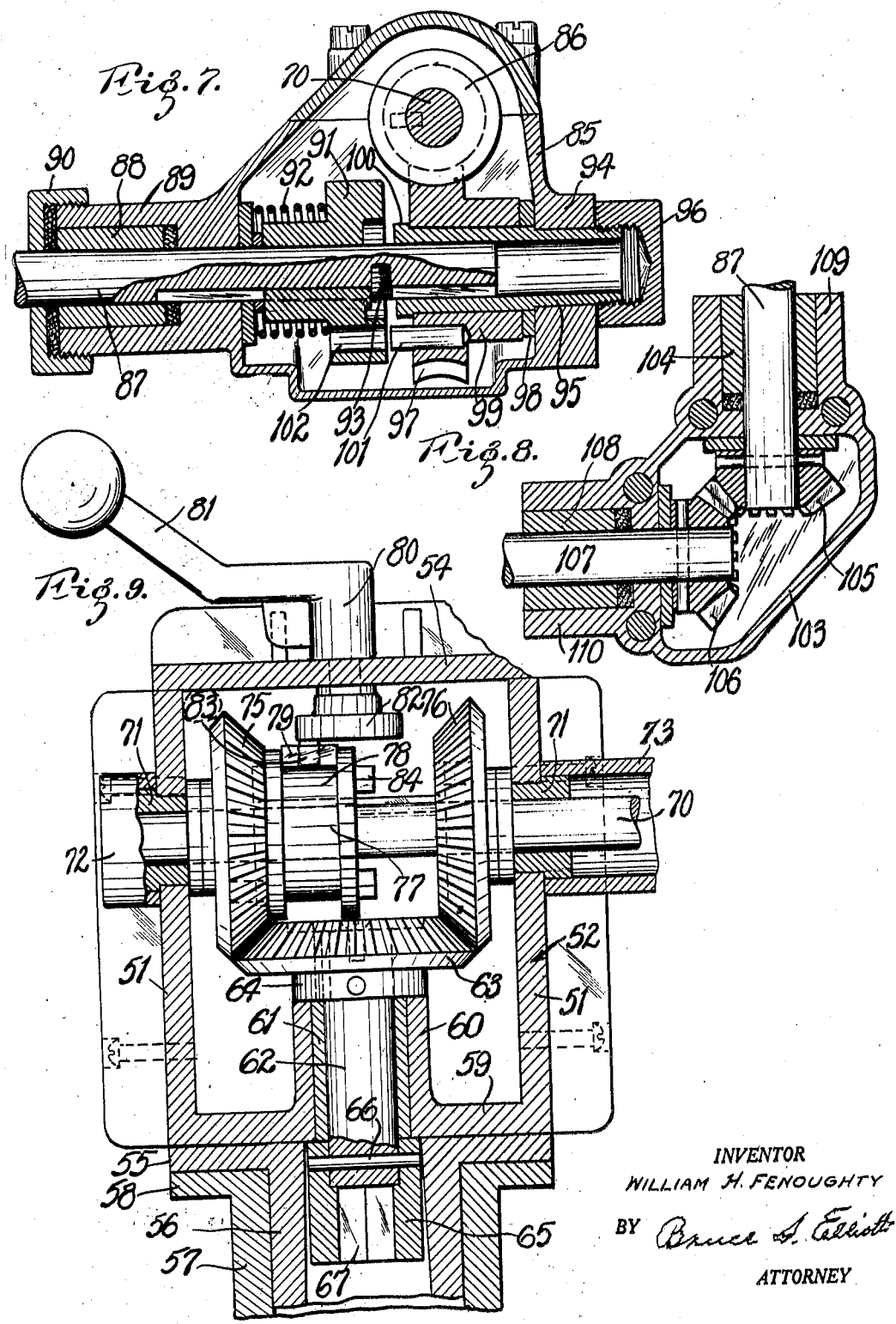

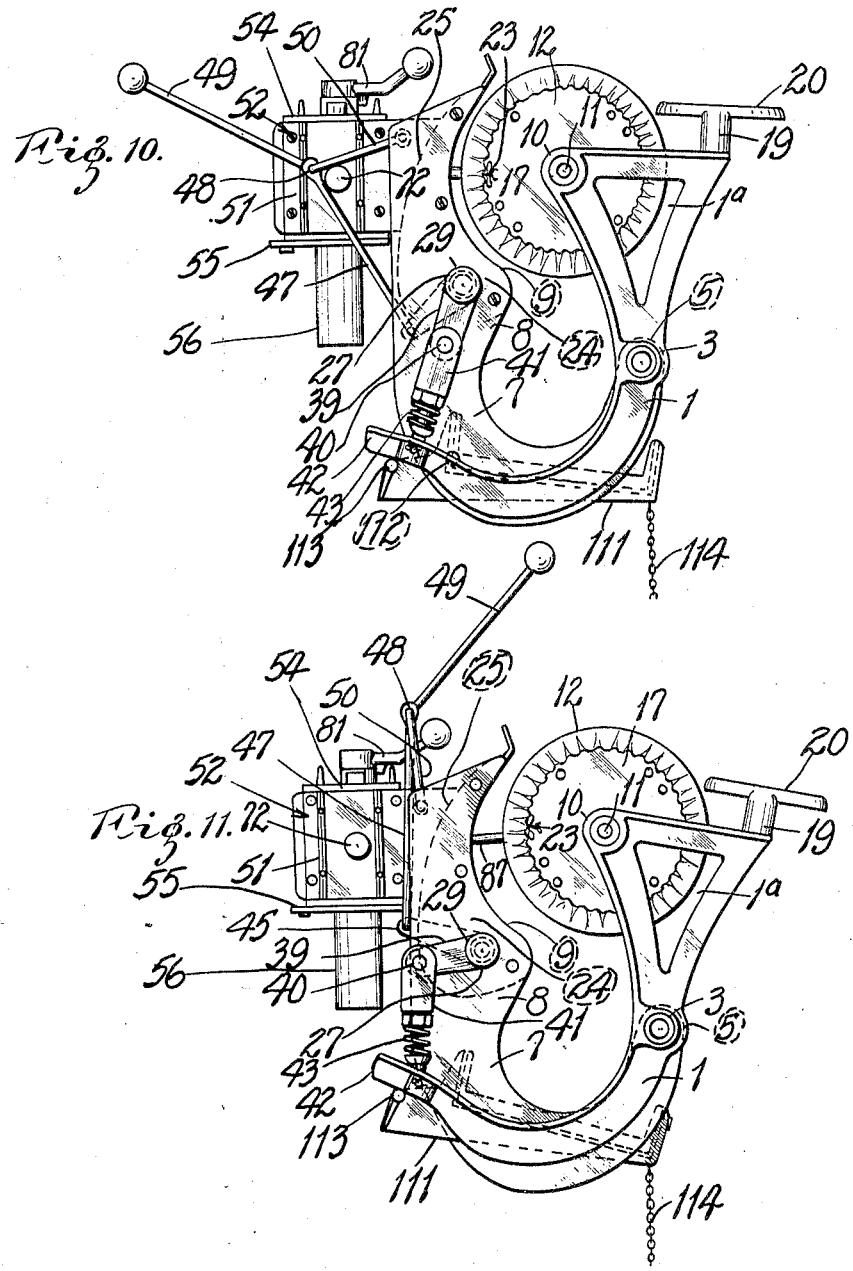

Jan. 17, 1928.
W. H. FENOUGHTY
1,656,783
MANGLE
Filed March 9, 1925    7 Sheets-Sheet 6
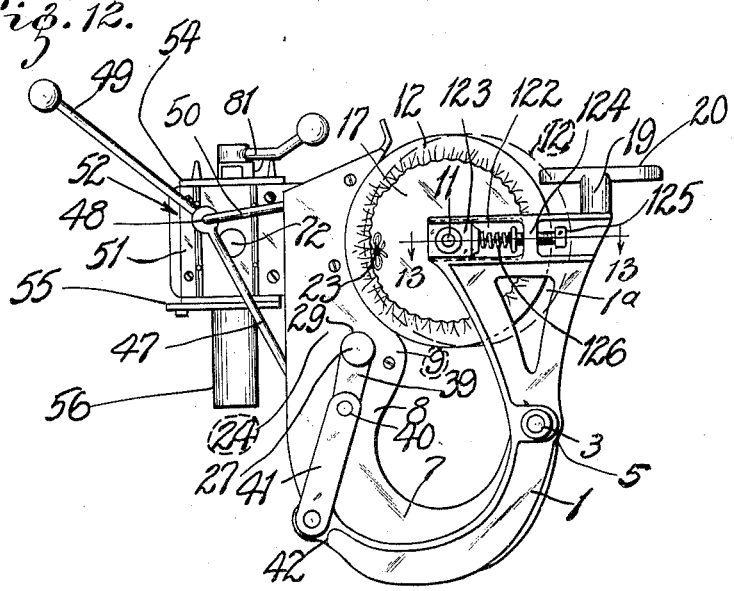
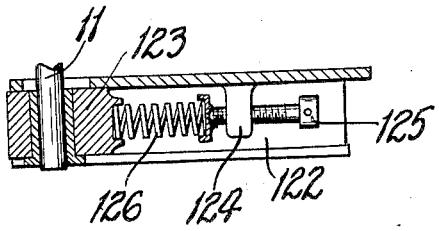
INVENTOR
WILLIAM H. FENOUGHTY.
BY
ATTORNEY Jan. 17, 1928. 1,656,783
W. H. FENOUGHTY
MANGLE
Filed March 9, 1925 7 Sheets-Sheet 7

INVENTOR
WILLIAM H. FENOUGHTY.
BY
ATTORNEY

Patented Jan. 17, 1928.

1,656,783

UNITED STATES PATENT OFFICE.

WILLIAM H. FENOUGHTY, OF BELLEVILLE, ILLINOIS.

MANGLE.

Application filed March 9, 1925. Serial No. 14,309.

The general object of this invention is to provide a novel construction of mangle, which is adapted for ready application to and removal from a motor-operated washing machine, in which application it is designed to be substituted in position for the ordinary wringer, and to be driven from the wringer drive shaft. Embodied in this general idea is a novel construction and arrangement of parts whereby the mangle is applied to and supported on the washing machine at a single point of attachment.

Other objects of the invention relate to novel mechanism for mounting the roll and for moving it toward and from the shoe which co-operates with the roll in the ironing operation; to provide a novel construction whereby the gas burner pipe, utilized for heating the shoe, is used as a rock arm shaft for moving the roll toward and from the shoe; to provide a mangle having an open end to permit of very wide articles, such as sheets, being ironed by permitting one portion of the article to project from the machine while another portion is being ironed; to provide a modified construction for the mounting of the roll to insure a right line movement thereof in relation to the shoe; to provide novel reversing, or gear-shifting, mechanism for the driving mechanism to permit the roll to be reversed, when such movement is desired, and also to accommodate the mangle to different types of washing machines which may vary in the direction of rotation of the driving mechanism, and to permit the roll drive to be placed in neutral position, whereby the roll may be used for pressing without being rotated; to provide a removable support for the mangle and a removable socket member for the reception of the wringer shaft to adapt the mangle for application to machines having different sizes and shapes of drive shaft and bearing support for the wringer; to provide castings on either end of the burner pipe for connection with the levers which actuate the hangers for the roll, one of said castings providing a gas-mixing device for the burner pipe, and the other serving to blank the end of the pipe; to provide a novel construction and arrangement of roll drive which permits of movement of the roll a given distance from the shoe without disengaging a clutch included in the roll driving mechanism; and, finally, to provide a novel construction for the mounting of the roll to permit the same to be removed from the hanger.

Other objects of the invention relate to novel constructions and arrangements of parts whereby I aim to provide a mangle which shall be simple and durable in construction, easy to operate, and economical to manufacture.

The invention is illustrated in the accompanying drawings, in which—

Figure 3 is a top plan view of the same;

Figure 4 is a view of the mangle in rear elevation;

Figure 1:
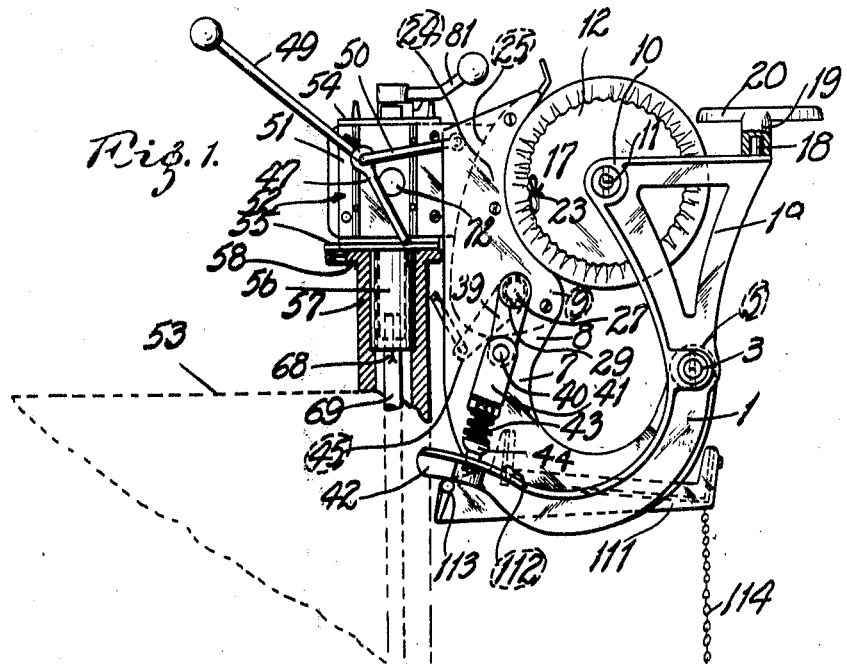
Figure 1 is a left-end elevation (viewed from the operator's position) showing the roll in contact with the shoe, a portion of the washing machine on which the mangle is mounted being shown in dotted lines.
Figure 2:
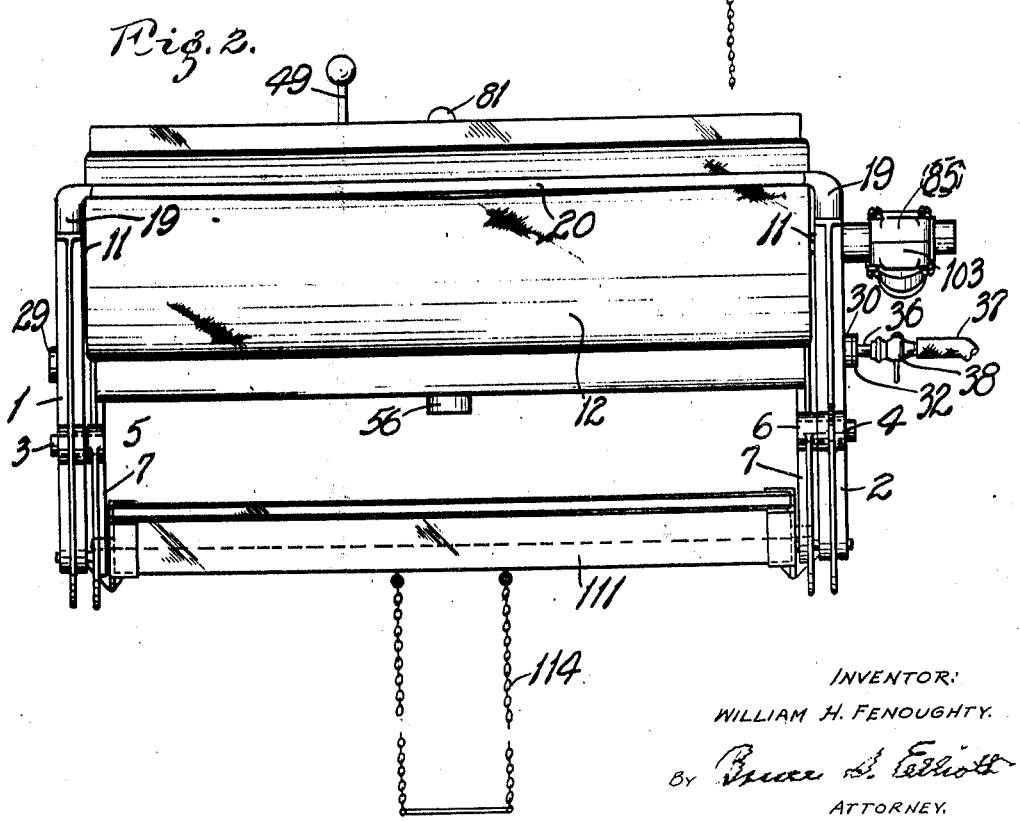
Figure 2 is a view in front elevation of my improved mangle.
Figure 5:
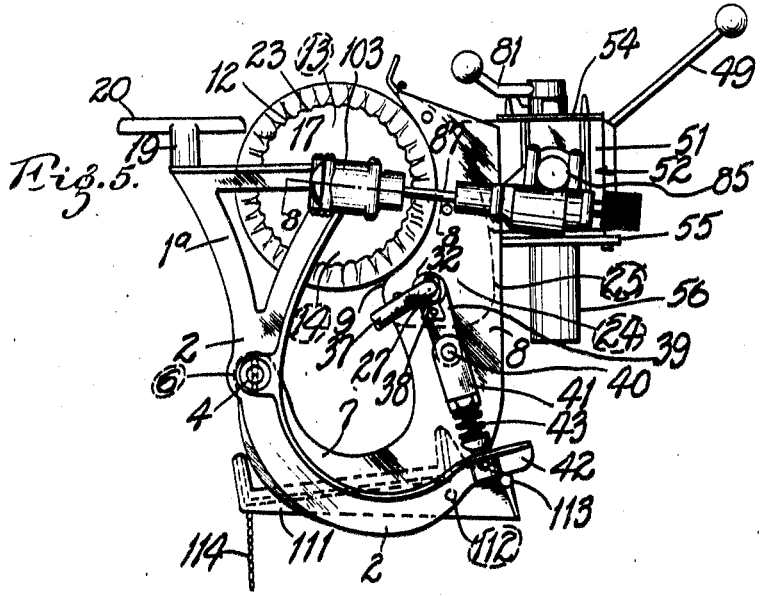
Figure 6:
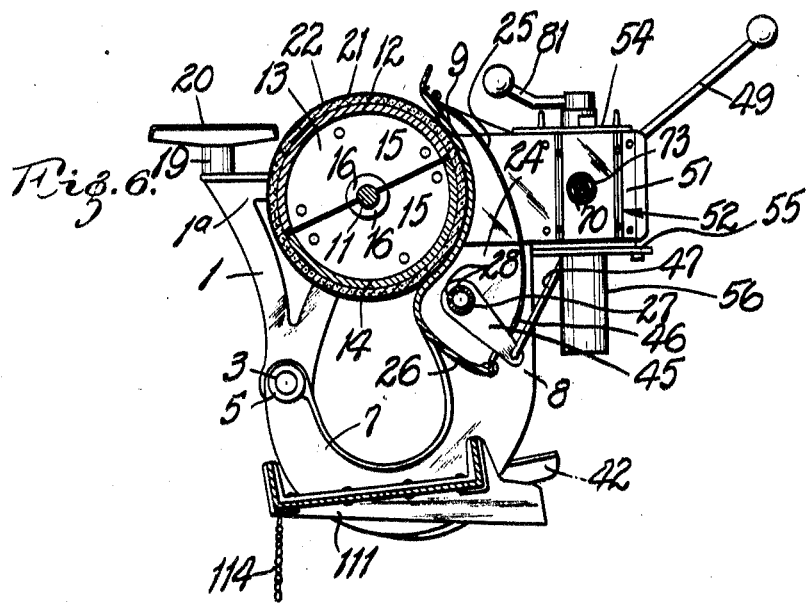
Figure 14:
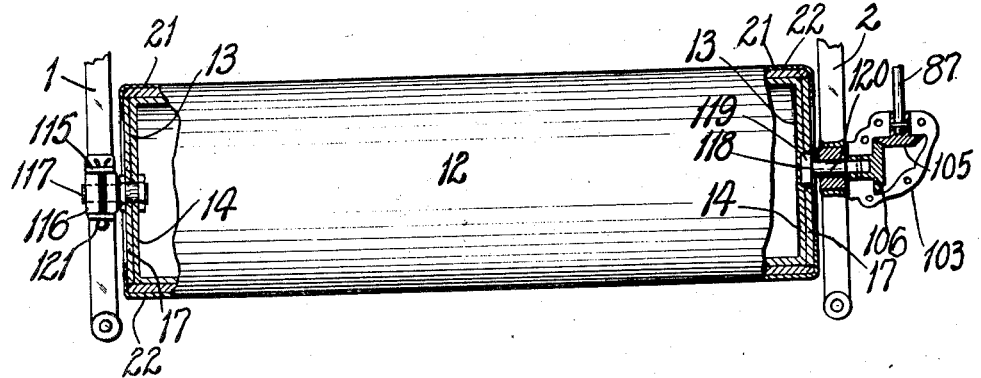
Figure 15:
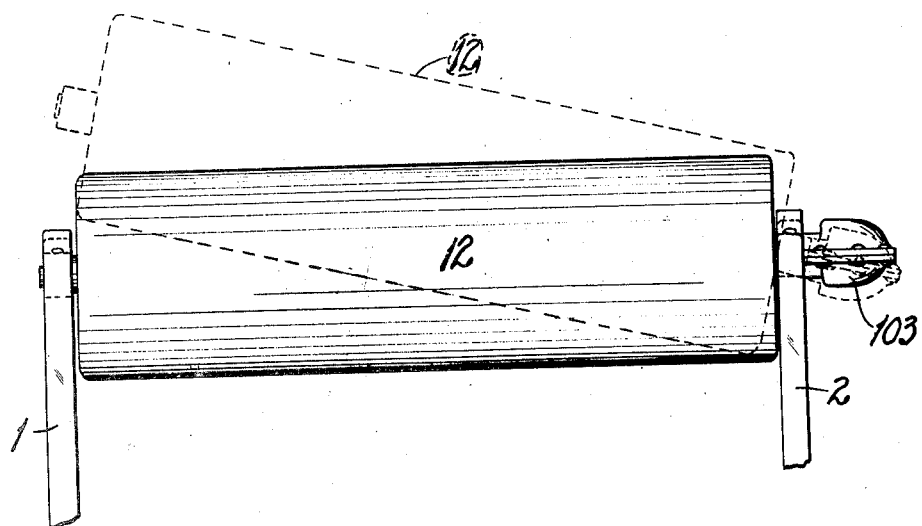

Figure 4ª is a sectional view on the line 4ª—4ª of Figure 4, showing the end of the casting which provides a gas-mixing device for the burner pipe;

Figure 5 is a right-side elevation;

Figure 6 is a vertical cross-section on the line 6—6 of Figure 3, viewed from the right, the parts having the corresponding positions shown in Figure 5;

Figure 7 is a fragmentary horizontal cross-sectional view on the line 7—7 of Figure 3, illustrating the worm-gear drive and safety clutch features of the roll;

Figure 8 is a fragmentary horizontal cross-sectional view on the line 8—8 of Figure 5, showing the bevel gear drive for the roll, having the position shown in Figure 3;

Figure 9 is a similar section taken on the line 9—9 of Figure 3 through the clutch and reverse mechanism for the roll;

Figure 10 is a view similar to Figure 1, showing the roll moved back a slight distance from the shoe by the use of the chain stirrup combined with the action of the clothes board, in which position the roll may continue rotating;

Figure 11 is a view similar to Figure 10 illustrating the extreme outward movement of the roll when drawn back by an operating lever when it is desired to stop the rotation of the roll so that articles to be ironed may be arranged under the roll conveniently, or when a very heavy or thick piece is to be run through the mangle;

Figure 12 is a view similar to Figure 1, showing a modified form of roll mounting, wherein the roll may move back when clothes are going through the mangle in a horizontal plane, instead of on an arc, which permits of uniform pressure on the clothes throughout the period of contact with the shoe;

Figure 13 is a fragmentary horizontal cross-sectional view on the line 13—13 of Figure 12, illustrating the spring-pressed journal and guide-way for the modified roll mounting of Figure 12;

Figure 14 is a fragmentary plan view, partly in section, of a modified form of roll mounting, whereby the roll may be readily removed from and replaced in the machine for convenience in shipping or general handling in the home; and Figure 15 is a front elevation of Figure 14, illustrating the manner and direction in which the roll is removed from its mounting on the end hangers.

Referring now to the drawings, and particularly to Figures 1, 2, 5, and 6, the numerals 1, 2, indicate hangers, each of which is pivotally mounted at points indicated by the numerals 3, 4, on the outer up-turned ends 5, 6, of U-shaped end frame members 7, the inner legs 8 of said frame members projecting upwardly and being connected on their outer sides at their upper end portions by a curved plate 9, constituting a shoe for co-operating with the roll of the mangle. Each of the hangers 1, 2, above its point of pivotal connection with the end frames, is substantially triangular in shape, as indicated at 1ª, and provides at the upper inner corner of the triangular portion a bearing 10, in which is mounted a trunnion 11 secured at each end of a roll 12.

As shown more particularly by Figure 6, the roll 12 is formed of two semi-cylindrical members 13, 14, each of which has a semi-circular casting 15 near its ends and each of which is provided with a central half-bearing 16 which is adapted to surround the trunnion 11, which latter is rigidly secured in position as by having nuts applied thereto on each side of the said castings. When the two semi-cylindrical members are placed together, a circular end plate 17 (as at the left-hand end in Figure 14) is inserted in the end of the cylindrical space at the ends of the roll to lie flush against the castings 15, to which it is secured by screws, rivets, or the like. This plate also lies flush with the ends of the semi-cylindrical members. This construction enables me to provide a hollow roll of durable construction, and, at the same time, very light in weight.

The upper part or base of the triangular portion 1ª of the hanger is provided at its outer corner with an upwardly extending pin 18, which is adapted to receive recesses provided in the ends of sockets 19 provided on opposite ends of a flat metal suport 20, which provides a removable table for supporting the pieces in applying them to the roll of the mangle, as well as for any other purpose for which such a support would usually be employed.

The roll 12, constructed as described, is completed by covering its outer surface with several layers of felt 21, which, in turn, is provided with an outer covering 22 of cloth having draw strings 23 at the ends, whereby the cloth may be drawn snugly about the roll to provide a smooth tight roll surface.

The shoe 9, previously referred to, forms the outer wall of a heating chamber 24, the other wall thereof being provided by a curved sheet metal member 25, secured at opposite ends on the inner sides of the upper portions 8 of the end frames, and at its lower end, to a bottom inward extension 26 of the shoe 9.

The lower end portion of each of the hangers 1, 2, follows the general contour of the end frame members 7, that is to say, they are curved rearwardly to have a general U-shaped form. Extending through the heating chamber 24 is a gas burner pipe 27 provided with perforations 28 for the escape of gas to be ignited, and also provided at one end with a casting 29 which will serve to close this end of the pipe. The other end of the pipe is provided with a similar casting 30, through which extend apertures 31 leading into the gas pipe, and which is provided on its outer end with a plate 32 (Figures 4 and 4ª), provided with suitable apertures 33 to communicate with the apertures 31, and being rotatable distances regulated by a slot 34 working over a screw 35 to regulate the amount of air supplied to the gas burner pipe 27. This pipe has a reduced extension 36 projecting beyond the valve plate 32, to which is secured a flexible pipe 37 through the medium of a valve coupling 38.

The manner of operating the hangers 1, 2, to move the roll 12 toward and from the shoe 9 will now be described, first premising that the construction at each end of the mangle for operating the two hangers is the same.

Projecting from each of the castings 29 and 30, mounted, respectively, on opposite ends of the gas burner pipe 27, is an arm 39, to the outer end of which is pivotally connected at 40 (Figure 1) the upper end of a similar arm 41, and between the lower end of arm 41 and the inner end 42 of each of the hangers 1 and 2 is mounted a coil spring 43, the lower end of which is secured on a lug 44 which is pivotally mounted in the ends 42 of the hangers. The arms 39 and 41 at each end of the machine constitute toggle levers which, when straightened, force the ends 42 of the hangers 1 and 2 downward, thereby turning said hangers on the pivots 3 and 4 and moving the roll 12 into contact with the shoe 9, the power of the toggles being exerted through the springs 43, so that the roll is always held in yielding contact with the shoe.

To manipulate the toggle levers, I fixedly secure on the gas burner pipe 27 one end of a rock arm 45 (Figures 4 and 6) the other end of which projects through an elongated opening 46 formed in the inner wall 25 of the heating chamber 24, and pivotally secure in the outer end thereof the lower end of a connecting rod 47 (Figure 3), the upper end of which is pivotally mounted on a horizontal bent portion 48 of a bent throw lever 49, which latter, at its lower end, has a horizontal portion 50 which extends through and is pivotally mounted in side plates 51 of a housing 52 for the reversing mechanism, to be later described.

With the parts in the position shown in Figure 1, in the movement of the throw lever 49 toward the operator, or in the direction away from the washing machine 53 (indicated by dotted lines), the arm 39 will be moved inwardly or to the left in Figure 1 to break the toggle lever, and by pulling upward on the arm 41, elevate the end 42 of each hanger to move the roll 12 away from the shoe 9. In the movement of the lever 49 in the opposite direction, the hangers will be turned to move the roll into contact with the shoe 9, and the toggle levers 39 and 41 will be straightened to lock the roll in such position. With the parts in the position shown in Figures 1, 5 and 6, the roll 12 is adapted to be rotated to cause the articles to be ironed to move with it over the smooth concave surface of the shoe 9.

The manner of mounting the mangle on the washing machine to permit the roll to be driven, and the mechanism for driving the roll will now be described, referring particularly to Figures 1, 3, 7, 8 and 9.

The side plates 51 of the housing 52, previously referred to, extend through openings in the sheet metal wall 25 of the heating chamber 24, and may be cast integral with or suitably secured at their inner ends to the inner side of the shoe 9. These side plates form the support for the housing 52, which is preferably rectangular in shape, and provided with a removable top plate 54 and a removable bottom plate 55. Cast integral with the bottom plate 55 is a hollow cylindrical support 56 which, when the mangle is applied to the washing machine, is adapted to be received snugly into a circular bearing 57 having a flanged upper end 58 on which the bottom plate 55 is adapted to rest. The housing 52 has an integral bottom 59 which is provided with a central circular bearing 60 (Figure 9) extending upward within the casting. Mounted within this bearing is a sleeve 61, which is adapted to receive a stub shaft 62 of a bevel gear 63 having a hub 64 resting upon the upper end of the bearing 60 and sleeve 61. The lower end of the stub shaft 62 is transversely apertured, and supported on the lower end of this shaft is a socket member 65, which is removably secured on the stub shaft by a pin 66 passing through apertures in the upper end of said socket member and through the transverse aperture in the end of the stub shaft. The socket member 65 is provided with a non-circular socket 67, which is adapted to fit over the upper non-circular end 68 (Figure 1) of the power shaft 69, which shaft is adapted to be driven by the motor of the washing machine in the usual manner.

The numeral 70 indicates the main drive shaft for the roll of the mangle, which shaft is located at the rear or inner side of the mangle, as shown by Figure 3, and extends at one end through the side walls of the housing 52, in which walls it is mounted in sleeve bearings 71, the outer sleeve bearing, or that shown at the left of Figures 3 and 9, being covered by a cap 72, and the other sleeve bearing supporting one end of a pipe 73, which houses the shaft 70 for the greater part of its length, and is supported at its other end in a casting 74 provided on the rear side of one of the end frame members 7. Loosely mounted on the shaft 70 within the housing 52 are bevel gears 75 and 76, which mesh with the bevel gear 63 at opposite sides thereof. Splined on the shaft 70 between the gears 75 and 76 is a clutch member 77 having a circumferential groove 78 in which, on the upper side of the clutch member, is mounted a slide block 79.

Rotatably mounted on the top plate 54 of housing 52 is a shaft 80 having a crank handle 81 for turning it; and mounted on the lower end of shaft 80 is a disk 82 having a pin 83 on its underside near the periphery which engages loosely in an aperture in the slide block 79. When the handle 81 is turned, the movement of the disk 82 and slide block 79 causes the clutch member 77 to be moved into engagement with one or the other of the bevel gears 75, 76, or the clutch may be moved to a neutral position between said gears. In the latter position, no movement of shaft 70 will result by the turning of the bevel gear 63, and this position of the clutch is used when it is desired to employ the roll for pressing. The inner face of each of the bevel gears 75, 76, is provided with shouldered recesses to engage corresponding shoulders 84 on the clutch, so that if the clutch member is engaged with one of the gears, as 75, the shaft 70 will be rotated in one direction, and if it is engaged with the gear 76, the shaft 70 will be turned in the opposite direction. The bevel gear 63 is rotated, of course, by the engagement of the socket 67 of the socket member 65 with the squared end 68 of the motor-driven shaft 69. The shaft 70 projects through the end of the pipe 73, as shown by Figure 3, the casting 74 providing a bearing for this end of the shaft, said projecting end entering a housing 85 (Figures 3 and 7) where it is provided with a worm 86. Entering the housing at right angles to the shaft 70 is a driven shaft 87, which is supported within said housing in a sleeve bearing 88 mounted in a cylindrical portion 89 of said housing, which latter is closed by a cap 90 screwed on the end of said cylindrical portion, suitable packing being interposed at each end of the sleeve bearing. Splined on the shaft 87 is a clutch member 91 which is adapted to be moved outwardly, or toward the right in Figure 7, by a coil spring 92, this movement being limited by a set screw 93 screwed in one side of the shaft 87. Mounted in a bearing 94 at the opposite side of the housing 85 to that from which the cylindrical member 89 projects is a sleeve 95 which is secured in position by a cap nut 96 screwed on its end and engaging the face of the bearing 94. Rotatably mounted on the sleeve 95 is a worm gear 97 which is in mesh with the worm 86 and rotates between a washer 98, interposed between the end of its hub 99 and the bearing 94, and a shoulder 100 on the inner end of the sleeve 95. This gear is provided with a pin 101 which is adapted to enter an opening 102 in the clutch member 91 when the latter is moved toward the worm gear by the spring 92. The shaft 87 extends from the housing 85 to a gear housing 103 (Figure 8), in which it is journalled in a sleeve bearing 104 and has mounted on its outer end a bevel gear 105 which meshes with a bevel gear 106 on the end of a shaft 107 which is journalled in a sleeve bearing 108. The sleeve bearings 104 and 108 are mounted in cylindrical extensions 109 and 110, respectively, extending at right angles to each other from the gear housing 103. The shaft 107 (see also dotted lines, Figure 3) extends through a bearing provided at the inner angle of the triangular portion 1ª of the hanger 2 and is fixedly secured to the end of the roll 12. The housing 85 and the housing 103 having bearings, respectively, on the shafts 70 and 107, are free to rock on said shafts. When the roll 12 is moved outward, or away from the shoe 9, by manipulating the lever 49 in the manner previously described, the shaft 87 will be drawn outward by the movement of the gear housing 103. This movement is toward the left, as the parts are shown in Figure 7. After the roll has moved a given distance, the set screw 93 will engage the inner face of the clutch member 91 and move it to the left in Figure 7 against the resistance of the spring 92. In the continuation of this movement, the clutch member will be moved out of engagement with the pin 101, and hence the drive to the roll through shaft 87 will be broken. When the roll is moved toward the shoe, the shaft 87 will move to the right in Figure 7, and the spring 92 will move the clutch member 91 to the right to cause the opening 102 to engage over the pin 101, and thus cause the shaft 87 to be rotated from the worm gear 97, which, in turn, is driven from the shaft 70. The construction shown in Figure 7 permits of considerable movement of the roll away from the shoe before the clutch member 91 is moved out of engagement with the pin 101. This permits the roll to be removed from the shoe and articles to be placed thereon while it is still rotating, thus greatly expediting the operation. It also permits the roll to be removed from the shoe and the direction of its movement to be reversed by actuating the clutch member 77 (Figure 5) by turning the handle 81, so as to rapidly remove, or partially remove, pieces from the mangle which may have been accidentally folded or creased in placing them on the roll, so that said pieces may be properly positioned and flattened out and again passed through the mangle. This is of great convenience in ironing large pieces, which might otherwise have to be run through the machine before they could be again properly positioned on the roll and ironed flat. It will be understood, of course, that in ironing, the pieces will adhere somewhat to the covered surface of the roll, so that when it is necessary to remove them, for such reasons as pointed out above, the reverse rotation of the roll while removed from contact with the shoe, greatly facilitates the operation of removing the material from the machine.

I provide a clothes rack 111 (Figures 5 and 6) for receiving the clothes as they pass through the mangle, and I also utilize this clothes rack in operating the roll to move it a slight distance from the shoe without disconnecting the clutch mechanism shown in Figure 7. To this end, the clothes rack 111, which is preferably of trough shape, is pivotally mounted at 112 (Figure 5) in the end castings of the machine, and is provided at its inner sides at each end with a projecting lug 113, which is adapted to engage under the inner end of the corresponding hangers 1 and 2. On the opposite or outer side of the clothes rack, I suspend therefrom a chain stirrup 114 (Figures 4, 5, and 6). By placing the foot in this stirrup and pressing downwardly, the operator can rock the clothes rack on its pivot 112, causing the lugs 113 to engage under the inner side of the hangers 1, 2, and move them upward against the resistance of the spring 43, thereby causing the roll 12 to be moved a desired distance from the shoe 9 for the purpose of removing or adjusting pieces on the roll, as previously described. This movement of the roll is accomplished without breaking the locked position of the toggle arms 39 and 41, as shown by Figure 10, and without disengaging the clutch member 91 from the worm gear 97, so that the roll will continue to be rotated.

In order to facilitate handling the mangle by reducing its weight and also in the interest of properly packing and shipping the same, I have provided means for mounting the roll in the hangers which will permit of the roll being readily removed from said hangers. This modified construction is illustrated in Figures 14 and 15, wherein the hanger 1 is provided with a bearing 115 open at its upper side, in which is mounted a bearing block 116 having a bearing for a journal 117 secured on the end of the roll 12. At its opposite end, the roll is provided with a shallow recess 118 which receives a squared projection 119 on the end of a shaft 120, journalled in a bearing in the hanger 2 and having the gear 106 secured on its end, which meshes with the gear 105 on the shaft 87, as previously described. The bearing block 116 may be removably held in position by a cotter pin, or the like, 121. To remove the roll from the hangers, the cotter pin 121 is withdrawn, which permits the adjacent end of the roll 12 to be raised until its bottom clears the hanger, after which the roll may be drawn off of the squared end 119 of shaft 120.

Other means than those described may be devised for removably mounting the roll in the hangers, and I have simply shown and described what I consider to be the simplest and most convenient manner of accomplishing this purpose. The operation of the machine in its entirety will now be given:

When it is desired to use the mangle, the wringer is removed from the washing machine and the supporting member 56 inserted in the washing machine bearing (Figure 1) with the socket member 67 (Figure 9) in engagement with the non-circular end 68 of the drive shaft 69. The gas issuing from the burner pipe 27 having been ignited and the shoe 9 heated thereby, the mangle is ready for the ironing operation.

The operator will now grasp the lever 49 and pull it toward her, or to the right in Figure 1, thereby, through the medium of connecting rod 47 and rock arm 45, breaking the toggle lever formed by the arms 39 and 41 and causing the arm 39 to raise the arm 41, thereby raising the inner end of the hangers 1 and 2, which, turning on the pivots 3 and 4, move the roll 12 away from the shoe, or to the position shown by Figure 11. The articles to be ironed having been adjusted on the roll, the operator again grasps the lever 49 and moves it in the opposite direction, thereby moving the roll toward the shoe, or to the position shown in Figures 1, 5 and 6. If the roll is not rotating, the operator next turns the crank handle 81 in one direction or the other to throw the clutch member 77 into engagement with one or the other of the gears 75, 76, according to the direction in which the wringer shaft rotates, and the articles are drawn over the concave side of the shoe 9, and as they emerge therefrom, fall upon the clothes rack 111.

In the event the operator wishes, for any reason, to reverse the rotation of the roll 12, she will turn the crank handle 81 to the opposite position to that just described.

In the event the roll 12 is to be used for pressing, the crank handle 81 is turned to place the clutch member 77 in a neutral position, that is, midway between the bevel gears 75 and 76, which would then permit the roll 12 to be moved in and out of engagement with the shoe 9 while the roll is maintained stationary. This arrangement will be useful in pressing trousers, coats, pants, and the like. Should the operator desire to remove the roll from the shoe without stopping its rotation, she simply places her foot in the chain stirrup 114 and presses down on the latter to turn the clothes rack 111 on its pivot, which causes the roll to be thrown outward a short distance, as previously described and as shown in Figure 10.

When the operator removes the roll from the shoe by manipulating the lever 49, the lever is always thrown to its extreme position, or that shown in Figure 11, in which movement the shaft 87 is drawn through its bearings to the position shown in Figure 7, in which movement the pin 93 engages the clutch member 91 and moves it out of engagement with the worm gear 97, thereby breaking the drive to the roll.

A leading feature of the invention as described is the fact, as shown more particularly by Figures 1, 10, and 11, that one end of the mangle, the left end as the operator faces the same, which is the end that is viewed in the figures referred to, is open or unobstructed, permitting large articles, such as sheets, or the like, to be ironed in one portion while the remaining portion hangs out of the machine, while at the other end (see Figure 3) the shaft 87 and connected parts are removed a considerable distance from the end of the mangle, leaving this end also partly unobstructed or open, so that articles may protrude from this end of the mangle also. In addition to the advantage stated for the open end of the mangle, such end and the partly open end at the right is of great advantage in facilitating the ironing of cuffs, neck bands, and the like, which may be inserted endwise into the mangle.

In Figures 12 and 13, I have shown a modified construction in the manner of mounting the roll to permit a right line movement thereof to allow it to assume a proper position relative to the shoe when an article of considerable thickness, such as a blanket, is being passed through the mangle, or where several articles, superimposed upon each other, are passed through the mangle. In the construction shown in Figure 1, if the roll were moved away from the shoe by a thickness of material, it will be apparent that its movement will be on the arc of a circle struck from the centers 3 and 4, the pivots of the hangers. In the modified construction, I provide the upper end of each hanger with a guide-way 122 in which is mounted a slide block 123 forming a bearing for the trunnions 11 of the roll. Mounted in a lug 124 (Figure 13) located at the rear of the guide-way 122, is a set screw 125, and between this set screw and the slide block 123 is interposed a coil spring 126. It will be seen that with thick material inserted between the roll and the shoe, the roll can move backward against the resistance of the spring 126 in a right line, and thus the pressure of the roll on the shoe, or on the material interposed between the roll and the shoe, will be uniform.

In this construction, it is unnecessary to interpose a spring between the arms 41 and the inner end of the hangers 1 and 2, as the function of this spring, namely, holding the roll in yielding contact with the shoe, is performed by the spring 126. With this construction also, the chain stirrup on the clothes rack would be omitted, as the hangers can only be moved by means of the lever 49.

In the accompanying drawings, I have shown a preferred embodiment of my invention. I wish it understood, however, that the invention is not limited to the precise details of construction or arrangement of parts as shown, as it will be apparent that various modifications may be made in the construction and arrangement of parts without departing from the broad scope of the invention as outlined in the appended claims.

I claim:

1. A mangle comprising a stationary ironing shoe and a roll movable toward and from the same, driving mechanism for rotating said roll, a hollow support fixedly secured on said mangle intermediate of the ends of said roll, a shaft for actuating said driving mechanism, and means on said shaft surrounded by said support adapting it for engagement with a driving shaft.

2. In combination with a supported casting affording a bearing and housing a drive shaft, a mangle comprising a stationary ironing shoe, a roll movable toward and from the shoe and driving mechanism for rotating said roll, a hollow support fixedly secured on said mangle intermediate of the ends of said roll and adapted to be engaged with said bearing to support the mangle thereon, and a driven shaft included in said driving mechanism and having an end housed in said support and fitted for engagement with the end of said driving shaft.

3. In combination with a supported casting affording a bearing and housing a drive shaft, a mangle comprising a stationary ironing shoe, a roll movable toward and from said shoe and driving mechanism for rotating said roll, a single support mounted on said mangle intermediate of the ends of said roll and adapted for engagement with said bearing, and a driven shaft included in said driving mechanism and provided with means for driving connection with said driving shaft.

4. A mangle comprising a frame, a stationary ironing shoe mounted thereon, a roll mounted on the frame and movable toward and from the shoe, driving mechanism mounted on the frame for rotating said roll, including a vertical shaft having a non-circular socket, and a hollow support mounted on said frame intermediate of the ends of said roll and surrounding said socket, whereby said mangle may be substituted, in position, on a washing machine for the wringer and said socket may receive the wringer drive shaft.

5. In combination with a supported casting affording a bearing and housing a drive shaft, a mangle comprising a stationary ironing shoe, a roll movable toward and from said shoe and driving mechanism for rotating said roll, supporting means for said mangle removably secured thereon intermediate of the ends of said roll and adapted to engage said bearing to support the mangle on said casting, and a driven shaft included in said driving mechanism and provided with means adapting it for engagement with said driving shaft.

6. In combination with a supported casting affording a bearing and housing a drive shaft, a mangle comprising a stationary ironing shoe, a roll movable toward and from said shoe and driving mechanism for rotating said roll, supporting means for said mangle removably secured thereon intermediate of the ends of said roll and adapted to engage said bearing to support the mangle on said casting, and a driven shaft included in said driving mechanism and provided with removable means adapting it for engagement with said driving shaft.

7. In combination with a supported casting affording a bearing and housing a drive shaft, a mangle comprising a stationary ironing shoe, a roll movable toward and from the same and driving mechanism for rotating said roll, single supporting means mounted centrally of said mangle in a longitudinal direction and adapted to be received into said bearing to support the mangle from said casting, means on said support for engaging said casting to prevent rotation of said support in said bearing, and a driven shaft included in said driving mechanism and provided with means for detachably engaging said driving shaft.

8. A mangle comprising an ironing shoe, a roll movable toward and from said shoe, driving mechanism for rotating said roll including a driven shaft slidable longitudinally of its axis and geared to and movable with said roll, and a spring pressed clutch engaged by an element on said shaft to open the driving mechanism when the roll is moved away from the shoe, said spring-pressed clutch being adapted to close the driving mechanism when the roll is moved into engagement with the shoe.

9. A mangle comprising an ironing shoe, a roll movable toward and from said shoe, driving mechanism for rotating said roll including a slidably mounted driven shaft geared to said roll and movable therewith, a spring-actuated clutch member splined on said shaft to co-act with said driving mechanism, and means on said shaft for disengaging the clutch from the driving mechanism against the resistance of the spring when the roll is moved away from said shoe.

10. A mangle comprising an ironing shoe, a roll movable toward and from the same, driving mechanism for rotating said roll including clutch mechanism, a shaft for actuating said driving mechanism, a housing pivotally mounted on said shaft and enclosing said driving mechanism, a slidably mounted driven shaft having a gear on one end, a fixed shaft on the end of the roll having a gear meshing with the gear of said driven shaft, a housing enclosing said gears and pivotally mounted on the shaft of said roll, said driven shaft being adapted to move back and forth as the roll is moved toward and from the shoe, said housings being adapted to turn on their mountings to permit such movement of the shaft, and a spring-actuated clutch member mounted on said driven shaft and adapted to be moved thereby to open the clutch when the roll is moved away from the shoe and to be moved by its spring to close the clutch mechanism when the roll is moved into engagement with the shoe.

11. A mangle comprising an ironing shoe, a roll movable toward and from the same, driving mechanism for rotating said roll including a driven shaft, a clutch member co-operating with said driving mechanism, and means for moving said clutch member into engagement with one or the other of two oppositely disposed gears of said driving mechanism for rotating said roll in one direction or the other, or to a neutral position in which the roll will not be rotated.

12. A mangle comprising a frame, an ironing shoe mounted thereon, a heating chamber associated with said shoe, a gas burner pipe for heating said chamber extending through and pivotally mounted in opposite ends of said chamber, a roll, hangers pivotally mounted on said frame and supporting said roll, lever mechanism connected to said gas burner pipe and to said hangers, and means for rocking said gas burner pipe to actuate said lever mechanism, whereby to move said hangers and cause said roll to be moved toward or from said shoe.

13. A mangle comprising a frame, an ironing shoe mounted thereon, a pair of arcuate hangers pivotally mounted intermediate their ends on said frame and supporting a roll at their upper ends, a rock shaft mounted in said frame, toggle levers, each of which is connected at one end to one end of said rock shaft and at its other end to the lower end of one of said hangers, means for actuating said toggle levers to rock said hangers on their pivots to move the roll toward and from said shoe, and a spring interposed between each of said hangers at the ends thereof remote from the ends supporting said roll and the lower member of each of said toggle levers for holding the roll in yielding contact with said shoe.

14. A portable mangle comprising a frame, an ironing shoe mounted thereon, a roll, supports for said roll pivotally mounted on the frame, means for actuating said supports to move the roll toward and from said shoe, one end of said mangle being open or unobstructed as respects the space between the shoe and the roll, and a support for the entire mangle fixed to the mangle intermediate of the ends of said roll and housing a driven member for rotating the roll.

15. A portable mangle comprising a frame, an ironing shoe mounted thereon, a roll, supports for said roll pivotally mounted on the frame, means for actuating said supports to move the roll toward and from said shoe, the ends of said mangle being substantially open or unobstructed as respects the space between the shoe and the roll, and a support for the entire mangle fixed to the mangle intermediate of the ends of said roll and housing a driven member for rotating the roll.

In testimony whereof, I have hereunto set my hand.

WILLIAM H. FENOUGHTY.